US008158055B2

(12) United States Patent
 Takahashi

(10) Patent No.: US 8,158,055 B2
(45) Date of Patent: Apr. 17, 2012

(54) MELTING FURNACE WITH AGITATOR

(76) Inventor: Kenzo Takahashi, Chiba-Ken (JP)

( * ) Notice: Subject to any disclaimer, the term of this patent is extended or adjusted under 35 U.S.C. 154(b) by 906 days.

(21) Appl. No.: 11/313,811

(22) Filed: Dec. 22, 2005

(65) Prior Publication Data

US 2006/0133194 A1 Jun. 22, 2006

(30) Foreign Application Priority Data

Dec. 22, 2004 (JP) .................................. 2004-371236
Jan. 7, 2005 (JP) .................................. 2005-002938

(51) Int. Cl.
 *B01F 13/08* (2006.01)
(52) U.S. Cl. ........... 266/234; 366/137; 366/273; 417/50
(58) Field of Classification Search .................. 366/147, 366/273, 274, 137; 164/468, 498, 499, 504; 266/233, 234, 235; 373/146; 417/50
 See application file for complete search history.

(56) References Cited

U.S. PATENT DOCUMENTS

| 2,464,714 | A | * | 3/1949 | Petersen | 373/144 |
| 2,729,692 | A | * | 1/1956 | Ratcliffe | 373/146 |
| 2,774,803 | A | * | 12/1956 | Dreyfus | 373/85 |
| 2,915,973 | A | * | 12/1959 | Findlay | 417/50 |
| 2,972,652 | A | * | 2/1961 | Seemann et al. | 373/146 |
| 3,199,842 | A | * | 8/1965 | Karlsson et al. | 366/147 |
| 3,306,829 | A | * | 2/1967 | Patterson et al. | 202/175 |
| 3,330,900 | A | | 7/1967 | Taylor | |
| 3,595,979 | A | * | 7/1971 | Shearman | 373/144 |
| 3,757,846 | A | * | 9/1973 | Herman, Jr. | 164/499 |
| 3,790,145 | A | * | 2/1974 | Gering | 266/234 |
| 3,846,264 | A | * | 11/1974 | Montillier Jean-Pierre | 204/157.71 |
| 3,851,090 | A | * | 11/1974 | Folgero et al. | 373/140 |
| 3,947,533 | A | * | 3/1976 | Davis | 264/437 |
| 4,072,598 | A | * | 2/1978 | Damgaard | 204/274 |
| 4,495,984 | A | * | 1/1985 | Kollberg | 164/468 |
| 4,611,338 | A | * | 9/1986 | Lillicrap | 373/161 |
| 4,986,340 | A | * | 1/1991 | Eriksson | 164/468 |
| 5,222,097 | A | * | 6/1993 | Powell et al. | 373/159 |
| 5,462,572 | A | * | 10/1995 | Tallback | 75/10.16 |
| 6,010,552 | A | * | 1/2000 | Gasperetti et al. | 75/10.16 |
| 6,402,367 | B1 | * | 6/2002 | Lu et al. | 366/273 |
| 6,550,526 | B1 | * | 4/2003 | Brungs et al. | 164/119 |
| 6,758,593 | B1 | * | 7/2004 | Terentiev | 366/273 |

(Continued)

FOREIGN PATENT DOCUMENTS

DE 2064467 A * 8/1971

(Continued)

OTHER PUBLICATIONS

Machine translation of JP 10146650. Generated by JPO translation engine Oct. 16, 2008.*

(Continued)

*Primary Examiner* — David Sorkin
(74) *Attorney, Agent, or Firm* — Mayer Brown LLP

(57) ABSTRACT

An agitator for agitating a melt includes a heat-resistive container having a blast opening through which cooling air is blown and an exhaust opening for exhausting air having been subjected to heat exchange, and a rotating magnet assembly composed of a permanent magnet housed in the heat-resistive container in a rotatable manner, magnetic lines of force emitted from the permanent magnet penetrating through the heat-resistive container to exit outside, and then penetrating the heat-resistive container again to return to the permanent magnet.

8 Claims, 4 Drawing Sheets

U.S. PATENT DOCUMENTS

| | | | |
|---|---|---|---|
| 7,497,988 B2 * | 3/2009 | Thut | 266/235 |
| 7,540,317 B2 * | 6/2009 | Kubota et al. | 164/466 |
| 7,675,959 B2 * | 3/2010 | Dardik et al. | 373/4 |
| 7,735,544 B2 * | 6/2010 | Kolesnichenko et al. | 164/468 |
| 7,736,586 B2 * | 6/2010 | Takahashi | 266/234 |
| 7,815,846 B2 * | 10/2010 | Takahashi | 266/233 |
| 2002/0190444 A1 * | 12/2002 | Kagan | 266/237 |
| 2004/0187964 A1 * | 9/2004 | Dardik et al. | 148/108 |
| 2009/0020925 A1 * | 1/2009 | Takahashi | 266/234 |
| 2009/0129197 A1 * | 5/2009 | Isidorov | 366/127 |
| 2009/0129429 A1 * | 5/2009 | Fishman | 373/146 |
| 2009/0229783 A1 * | 9/2009 | Kolesnichenko et al. | 164/468 |
| 2009/0242165 A1 * | 10/2009 | Beitelman et al. | 164/499 |
| 2009/0322000 A1 * | 12/2009 | Takahashi | 266/234 |
| 2010/0044934 A1 * | 2/2010 | Taniguchi et al. | 266/234 |
| 2010/0148411 A1 * | 6/2010 | Araseki et al. | 266/234 |

FOREIGN PATENT DOCUMENTS

| | | | |
|---|---|---|---|
| DE | 2125768 A | * | 12/1972 |
| DE | 3041741 A | * | 5/1982 |
| DE | 3213767 A | * | 10/1983 |
| EP | 1578009 A2 | | 9/2005 |
| FR | 2277491 A | * | 3/1976 |
| FR | 2440673 A | * | 7/1980 |
| FR | 2623210 A | * | 5/1989 |
| GB | 721121 | * | 12/1954 |
| GB | 1336166 A | * | 11/1973 |
| GB | 1430082 A | * | 3/1976 |
| GB | 2103131 A | * | 2/1983 |
| JP | 62-168756 | | 10/1987 |
| JP | 62251210 | | 10/1987 |
| JP | 63300419 A | * | 12/1988 |
| JP | 01-097149 | | 4/1989 |
| JP | 01180226 A | * | 7/1989 |
| JP | 05253179 | | 10/1993 |
| JP | 07-108355 | | 4/1995 |
| JP | 08303292 | | 11/1996 |
| JP | 10-146650 | | 6/1998 |
| JP | 2000329476 A | * | 11/2000 |
| JP | 2001-179409 | | 7/2001 |
| JP | 2001351794 | | 11/2001 |
| JP | 2002005426 | | 1/2002 |
| JP | 2002023074 | | 1/2002 |
| JP | 2002-051503 | | 2/2002 |
| JP | 2003056831 A | * | 2/2003 |
| JP | 2003-156286 | | 5/2003 |
| RU | 2004898 C1 | * | 12/1993 |
| RU | 2080535 C1 | * | 5/1997 |
| RU | 2233344 C1 | | 7/2004 |
| SU | 273832 A | * | 3/1978 |
| SU | 777858 B | * | 1/1980 |
| SU | 738759 B | * | 6/1980 |
| SU | 828439 B | * | 5/1981 |
| SU | 899261 B | * | 1/1982 |
| SU | 1065671 A | * | 1/1984 |
| SU | 1124786 A | * | 11/1984 |
| SU | 1152095 A | * | 4/1985 |
| SU | 1246420 A | * | 7/1986 |
| SU | 1377555 A | * | 2/1988 |
| SU | 1419801 A | * | 8/1988 |
| SU | 1541698 A | * | 2/1990 |
| SU | 1636675 A | * | 3/1991 |
| SU | 1701386 A1 | * | 12/1991 |
| WO | WO 90/04879 | * | 10/1988 |
| WO | WO 9428366 A1 | * | 12/1994 |
| WO | 02/33339 A1 | | 4/2002 |

OTHER PUBLICATIONS

Machine translation of JP 2002051503A. Generated by JPO translation engine Oct. 16, 2008.*

Machine translation of JP 2003156286A. Generated by JPO translation engine Oct. 16, 2008.*

Machine translation (EPO) of FR 2623210 A. Generated Sep. 2, 2009.*

Machine translation of JP 2003-056831 A (JPO) generated Feb. 24, 2011 (foreign patent document itself is attached to Office action mailed Sep. 15, 2010).*

European Patent Office Extended Search Report for application No. 05257929.9-2122 dated Apr. 27, 2007.

* cited by examiner

MELTING FURNACE WITH AGITATOR

CROSS-REFERENCE TO RELATED APPLICATION

This application is based upon and claims the benefit of priority from prior Japanese Patent Application Nos. 2004-371236 and 2005-2938, filed on Dec. 22, 2004 and Jan. 7, 2005, respectively, the entire contents of which are incorporated herein by reference.

BACKGROUND OF THE INVENTION

1. Field of the Invention

The present invention relates to an agitator, an agitating method, and a melting furnace with an agitator.

2. Background Art

Conventionally, ingots serving as commercial products are made from a conductive melt of a metal, a nonferrous metal and other materials. The conductive melt is a melted conductive material of Fe, Al, Cu, Zn, Pb, Ti, Mg, or an alloy or composite of at least two of these materials. On such an occasion, in order to obtain ingots having uniform quality, it is necessary to fully agitate aluminum, etc. in the melting furnace. For this reason, a stirring rod is put into a melting furnace to manually agitate melted aluminum etc., or an electrically driven agitating system is provided below a furnace to agitate melted aluminum etc.

The aforementioned manual agitation should be performed at a very high temperature under harsh conditions. Accordingly, adverse effects on workers cannot be ignored. When the aforementioned electrically driven agitating system is used, it is necessary to effectively form a strong magnetic field which is required to perform the agitation. Accordingly, a large amount of electric power is required. Furthermore, in order to form a magnetic field, a coil is used, and the coil must be cooled in order to curb the oscillation thereof. The cooling process must be carefully performed, and the system for the cooling is complicated and requires a high cost. Since the entire system is very expensive, the employment thereof represents an investment. Accordingly, it is not possible to easily employ such a system.

SUMMARY OF THE INVENTION

The present invention is proposed in consideration of the aforementioned circumstances, and it is an object of the present invention to provide an agitator, an agitating method, and a melting furnace with an agitator which use electric power as motive energy, but can be installed at a low cost.

The agitator for agitating a melt according to the present invention includes: a heat-resistive container having a blast opening through which cooling air is blown and an exhaust opening for exhausting air having been subjected to heat exchange; and a rotating magnet assembly composed of a permanent magnet housed in the heat-resistive container in a rotatable manner, magnetic lines of force emitted from the permanent magnet penetrating through the heat-resistive container to exit outside, and then penetrating the heat-resistive container again to return to the permanent magnet.

In a method of agitating a melt in a melting furnace main body according to the present invention, an agitator is provided inside or outside the melting furnace main body, the agitator including: a heat-resistive container having a blast opening through which cooling air is blown and an exhaust opening for exhausting air having been subjected to heat exchange; and a rotating magnet assembly composed of permanent magnets housed in the heat-resistive container in a rotatable manner, magnetic lines of force emitted from the permanent magnets penetrating through the heat-resistive container to exit outside, and then penetrating the heat-resistive container again to return to the permanent magnet, and the rotating magnet assembly of the agitator is rotated to agitate the melt in the melting furnace main body.

An agitator for agitating a melt according to the present invention includes: a casing including a casing body of a nonmagnetic material, and a top cover covering the casing body, the top cover having a first opening for blowing air, which connects the inside and the outside of the casing, and a second opening for discharging air; and a rotating magnet assembly housed in the casing and supported so as to be rotatable around a substantially vertical axis, the rotating magnet assembly having an upper rotation axis and a lower rotation axis, at least the upper rotation axis being a hollow body, the upper rotation axis connecting to the outside of the casing through the first opening so that it is possible to send air from the outside to the inside of the casing, the rotating magnet assembly being magnetized so that different magnetic poles are alternately arranged along the outer periphery thereof.

An agitator for agitating a melt according to the present invention includes: a heat-resistive container; and a rotating magnet assembly rotatably housed in the heat-resistive container, wherein: a hollow rotation axis penetrating the rotating magnet assembly is fixed to the rotating magnet assembly, the rotation axis rotatably mounting the rotating magnet assembly to the heat-resistive container; one end of the hollow rotation axis penetrates the heat-resistive container to exit outside so that cooling air can be introduced from outside, the other end has an opening in the heat-resistive container, and the heat-resistive container has an opening for discharging the introduced air to the outside; and the rotating magnet assembly is magnetized so that different magnetic poles are alternately arranged around the rotation axis along the outer periphery thereof.

DESCRIPTION OF THE EMBODIMENTS

Figure 1:
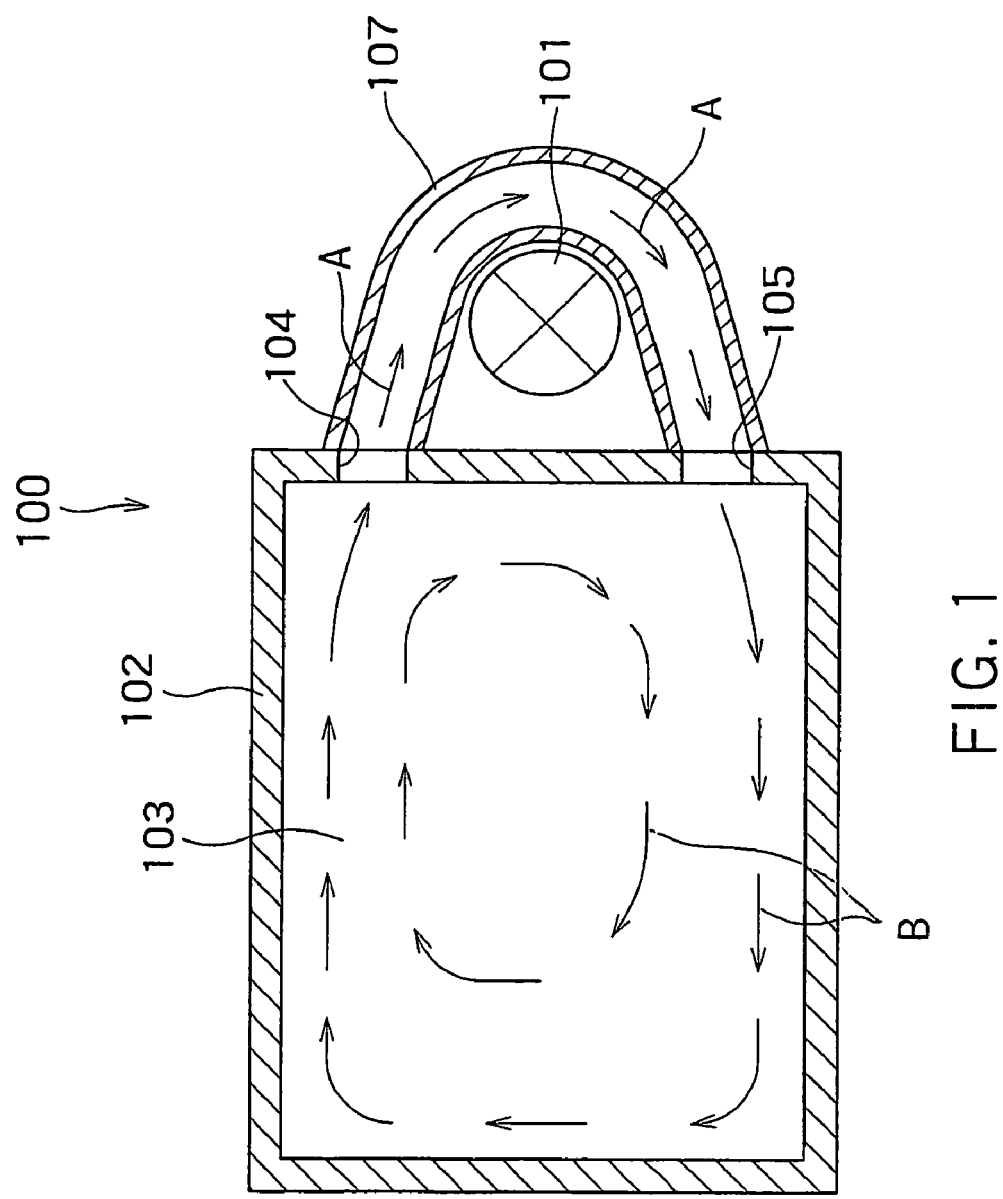
FIG. 1 is a drawing showing the entire structure of a melting furnace with an agitator according to the present invention.

FIG. 1 shows, in a planar manner, the entire structure of a melting furnace system (melting furnace with an agitator) 100 incorporating an agitator 101 according to the present invention. As a melting furnace (melting furnace main body) 102, a conventional or existing one can be used. The melting furnace 102 is configured to heat and melt, by various kinds of burners (not shown), scrap or the like of a nonferrous material such as aluminum (a nonferrous material such as Al, Cu, Zn, an alloy of at least two of these materials, and a conductive nonferrous metal such as an Mg alloy) which is put thereinto. It is apparent that besides melting furnaces for melting nonferrous metals, the present invention can be applied to some melting furnaces for melting other metals. On one of the four sidewalls of the melting furnace 102, a melt outlet 104 and a melt inlet 105 are opened. The melt outlet 104 and the melt inlet 105 are connected by a U-shaped melt passage member 107 of a fire-resistant material (or heat-resistant material). As a result, a melt 103 in the melting furnace 102 is discharged from the melt outlet 104, circulated through the member 107 and returned to the melting furnace 102 through the melt inlet 105.

The agitator 101 is located within the U-shaped melt passage member 107, i.e., between the member 107 and the melting furnace 102, along the inner surface of the passage member 107. The melt in the melting furnace 102 continuously flows out of the melt outlet 104, through the member 107, and into the inlet 105, as shown by arrows A in the drawing, by the operation of the agitator 101 which will be described in detail later.

Figure 2:
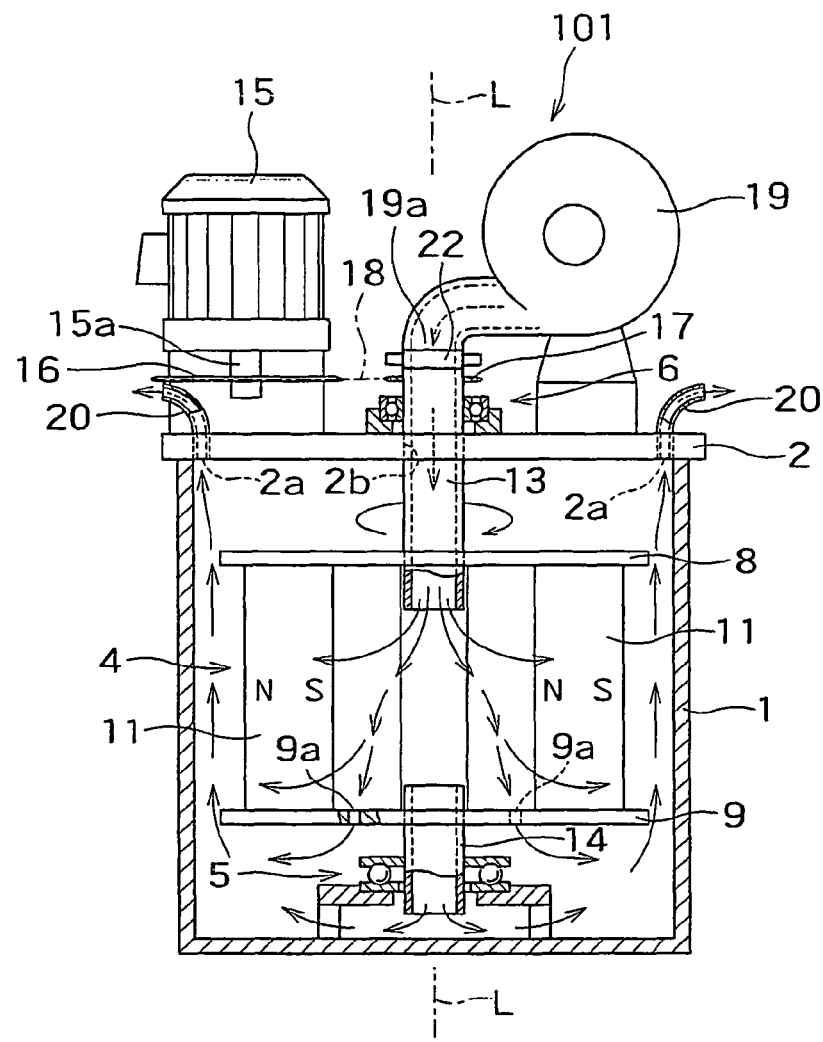
FIG. 2 is a side view obtained by sectioning a part of the agitator incorporated into the melting furnace shown in FIG. 1.

As a result, the melt 103 in the melting furnace 102 is agitated as shown by the arrows B in the drawing. The details of the agitator 101 are shown in FIG. 2. Briefly, the agitator 101 rotates magnets, thereby rotating magnetic lines of force (magnetic field) emitted therefrom, resulting in that the melt in the melt passage member 107 is forcibly moved in the direction along the arrows A in FIG. 1 by an electromagnetic force. In addition, the agitator 101 is provided with an air cooling mechanism for effectively cooling the heat generated during the aforementioned process.

Hereinafter, the agitator 101 will be described in more detail.

Figure 3:
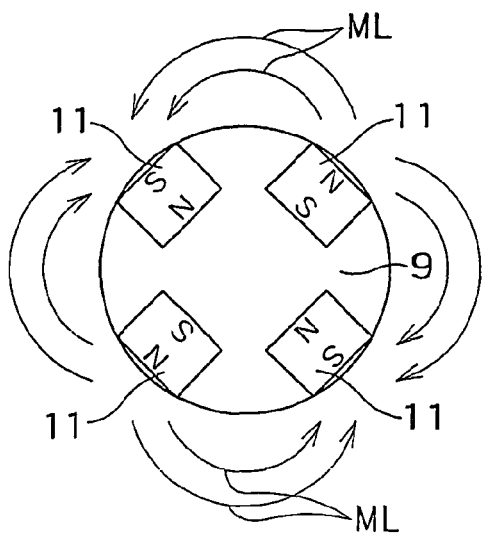
FIG. 3 is an explanatory drawing showing a part of the rotating magnet assembly shown in FIG. 2 in a planar manner.

In FIG. 2, an outer casing 1 serving as a casing of a nonmagnetic material such as stainless steel is provided with a top cover 2. Within the outer casing 1, a rotating magnet assembly 4 is axially supported so that it can be rotated around a substantially vertical axis L. Specifically, lower side bearings 5 are mounted at the bottom, within the outer casing 1. Furthermore, on the outer surface of the top cover 2, upper side bearings 6 are mounted. The rotating magnet assembly 4 axially supported by the bearings 5 and 6 has an upper mirror plate 8 serving as an upper supporting plate and a lower mirror plate 9 serving as a lower supporting plate, and four magnet bodies 11, 11, . . . composed of permanent magnets are fixed between the upper and lower mirror plates. The number of the magnet bodies 11 is not limited to four, but another arbitrarily decided plural number, e.g., six, can be employed. As can be understood from FIG. 3, which is a drawing obtained by removing the upper mirror plate 8 from FIG. 2 and viewing the rotating magnet assembly 4 from above, each of the magnet bodies 11, 11, . . . are located substantially at an angle of 90 degrees with adjacent magnet bodies. In each magnet body 11, N and S magnetic poles are set at the inside and the outside. The magnet bodies 11, 11 . . . are arranged such that the polarity thereof is reversed every 90 degrees. Accordingly, magnetic lines of force ML are produced as shown in FIG. 3. Of course the magnetic lines of force ML pass through the melt in the passage member 107 when the agitator 101 is in the set state shown in FIG. 1. Furthermore, an upper hollow shaft 13 and a lower hollow shaft 14 serving as upper and lower rotating shafts for rotating the aforementioned upper and lower mirror plates 8 and 9 penetrate the upper and lower mirror plates 8 and 9 and are fixed thereto. Specifically, the upper hollow shaft 13 penetrates a blast opening 2b of the top cover 2. The upper and lower hollow shafts 13 and 14 are rotatably supported by the upper and lower side bearings 6 and 5.

A driving motor 15 for rotating and driving the rotating magnet assembly 4 is fixed on the top cover 2. A driving side sprocket 16 is fixed to a driving shaft 15a of the motor 15, and a driven side sprocket 17 is fixed to the upper hollow shaft 13. A power conveying chain 18 is wound around the pair of sprockets 16 and 17. With this structure, the rotating magnet assembly 4 is rotated by the driving force of the driving motor 15.

A blower 19 is mounted on the top cover 2. An exhaust port 19a of the blower 19 is fixed to the upper hollow shaft 13 via a coupling 22 in a communication state. The coupling 22 supports the hollow shaft 13, which is rotated and placed below the coupling 22 in the drawing and the exhaust port 19a of the blower 19, which is in a stationary state and placed above the coupling 22 so that they can communicate with each other. With such a structure, a blow from the blower 19 passes between the magnet bodies 11, 11, . . . in a horizontal direction, and passes through blowholes 9a, 9a, . . . provided to the lower mirror plate 9 and through the lower hollow shaft 14 in a downward direction. Then, the blow changes direction to an upward direction, and exits outside from emission ports 2a, 2a, . . . and emission tubes 20, 20, . . . provided to the top cover 2. During such a flow process, the heat generated by the outer casing 1 based on an electromagnetic force (eddy current) is cooled down. The outer casing 1 can be made of a heat-resistant resin. In such a case, the self-heating due to Joule heat does not occur, but the cooling of the radiation heat from the melt etc. can be effectively performed by the use of the blower 19.

Thus, as mentioned before, in the melting furnace system 100 shown in FIG. 1, the aluminum melt in the melt passage member 107 is forcibly circulated by the agitator 101 as shown by the arrows A, and the melt 103 in the melting furnace 102 is also circulated and agitated as shown by the arrows B. In the agitator 101, the blow from the blower 19 is forcibly sent to the inside, as shown in FIG. 2. As a result, the Joule heat generated at the outer casing 1 due to the eddy current as the magnet bodies 11, 11, . . . are rotated is cooled down by the blow from the blower 19.

In the aforementioned embodiment, the rotating magnet assembly 4 is formed by fixing four magnet bodies 11, 11, . . . composed of permanent magnets between two, i.e., the upper and lower, mirror plates 8 and 9 so that the magnet bodies are in a standing state. However, it is apparent that the structure is not limited to the aforementioned one, but can be any form of magnetic structures that can generate magnetic lines of force as shown in, or in accordance with FIG. 3.

The experiments performed to confirm the operations of the system will be described below.

According to a melt agitation experiment by the use of the system according to the embodiment of the present invention, the melt was very effectively agitated with the conditions of the magnetic field strength of 0.05 T, and the rotations frequency of 1 Hz or more in the agitator 101. According to this experiment result, it was possible to fully agitate 1 ton of aluminum melt with the power consumption of 0.72 kw. In contrast, when a conventional electromagnetic type agitator was used, the power consumption thereof was 1.6-3.75 kw/ton. As can be understood from this experiment result, the system of the present invention requires considerably less power consumption to agitate 1 ton of melt. The melt agitation speed was equal to or more than 40 m/min.

Next, a different embodiment will be described below.

Figure 4:
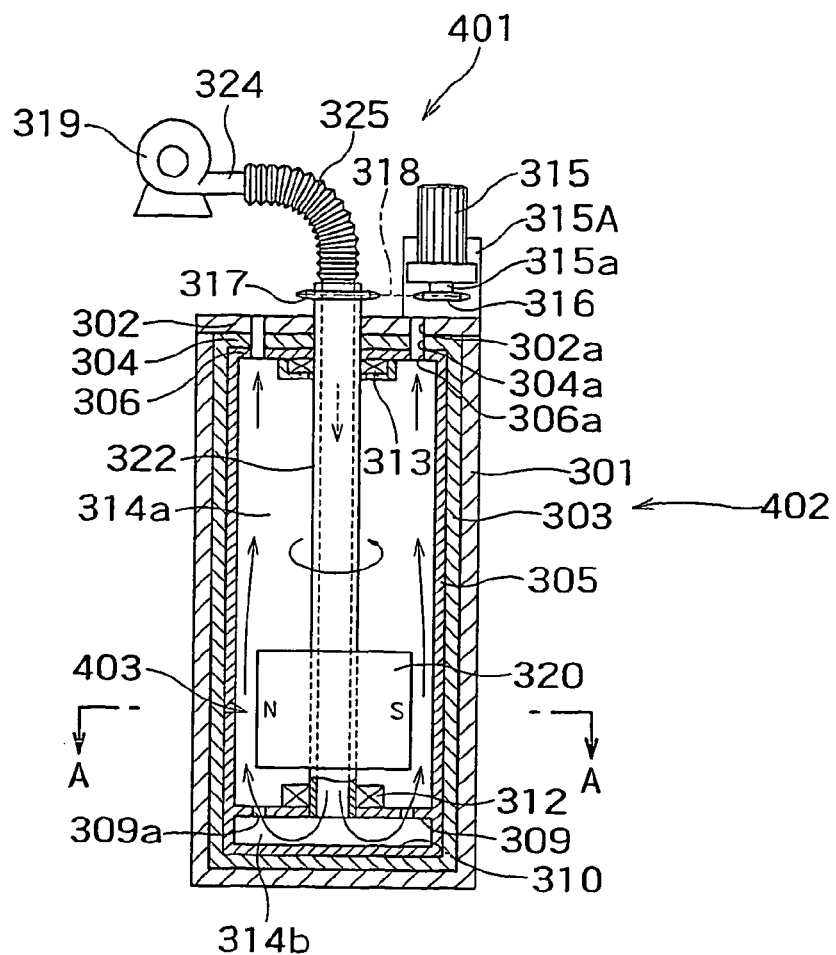
FIG. 4 is a side view of a part of a different agitator according to the present invention.
Figure 5:
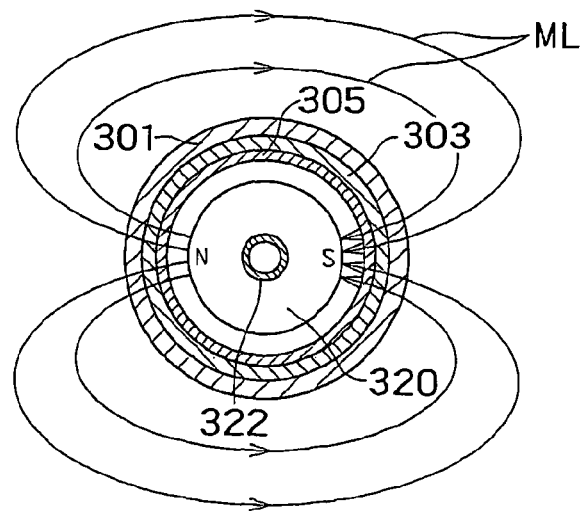
FIG. 5 is a sectional view taken along line A-A in FIG. 4.
Figure 6:
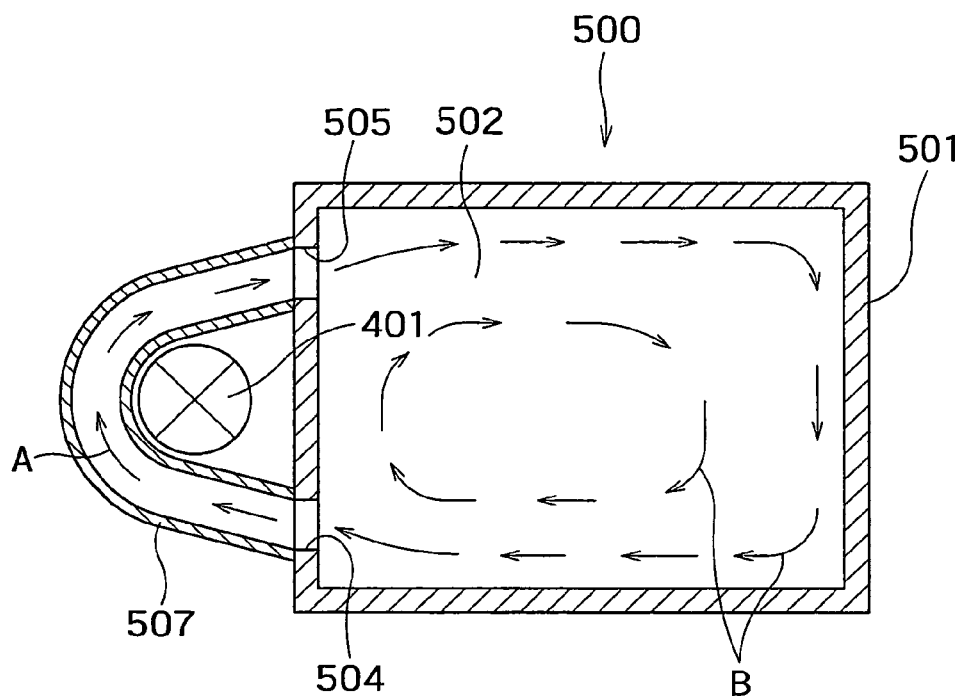
FIG. 6 is a drawing showing the entire structure of a melting furnace with an agitator incorporating the agitator of FIG. 4.
Figure 7:
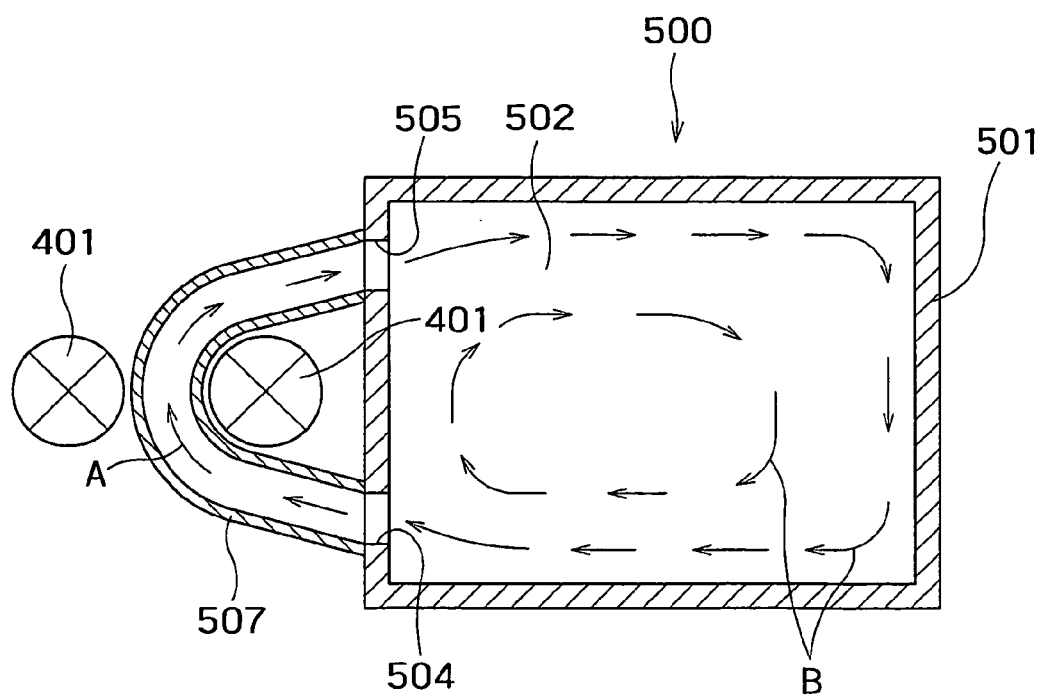
FIG. 7 shows a modification of the melting furnace shown in FIG. 6.

FIGS. 4 and 5 show an agitator 401 serving as another embodiment of the present invention. Of course the agitator 401 can be used to replace the agitator 101 shown in FIG. 1. The agitator 401 is heat-resistive, and can be used by being put into a commonly used melting furnace, or being located immediately outside the furnace wall of a melting furnace, as shown in FIGS. 6 and 7. Of course, the agitator 101 shown in FIG. 2 can be used to replace the agitator 401 shown in FIGS. 6 and 7.

As can be understood from FIGS. 4 and 5, the agitator 401 is formed by housing a shifting magnetic field generating apparatus 403 in a heat-resistive container 402, having a cooling device and a multilayer structure. The heat-resistive container 402 includes an outer casing (heat-resistive material cylinder) 301 serving as a casing of a nonmagnetic material such as stainless steel or the like, and a top cover 302. An insulating material cylinder 303 and a stainless steel cylinder 305 are sequentially housed in the outer casing 301 to form a so-called "nested structure." The insulating material cylinder 303 and the stainless steel cylinder 305 have covers 304 and 306, respectively. The stainless steel cylinder 305, which is the innermost, has two bottoms, i.e., an upper bottom 309 and a lower bottom 310. The inside of the stainless steel cylinder 305 is sectioned by the upper bottom 309 to form an upper space 314a and a lower space 314b. Air holes 309a, 309a, . . . penetrating the upper bottom 309 to connect the upper and lower spaces 314a and 314b are opened in the upper bottom 309. As will be described later, cooing air sent from a blower 319 to the lower space 314b via a hollow rotation axis 322 flows into the upper space 314a through the air hole 309a, 309a, . . . and then flows to the outside through air holes 302a, 304a, and 306a. Lower bearings 312 are fixed on the upper bottom 309, and upper bearings 313 are provided inside the cover 306 of the stainless steel cylinder 305. The air holes 302a, 304a, and 306a are opened through the covers 302, 304, and 306, respectively, to connect the upper space 314a with the ambient air.

The shifting magnetic field generating apparatus 403 housed in the heat-resistive container 402 having the aforementioned structure includes a rotating magnet assembly 320. The rotating magnet assembly 320 is substantially ring-shaped. In particular, as can be understood from FIG. 5, portions opposed to each other on the outer periphery are magnetized to form an N pole and an S pole. As a result, magnetic lines of force ML are formed as shown in FIG. 5. The magnetic lines of force ML penetrate the melt regardless of whether the agitator 401 is soaked in the melt or provided outside the melting furnace. Accordingly, as the rotating magnet assembly 320 is rotated, the magnetic lines of force ML move in the melt such as aluminum melt, thereby rotating the melt.

The hollow rotation axis 322 is fixed to the rotating magnet assembly 320 in a penetrating state. The rotation axis 322 is supported by the upper and lower bearings 313 and 312 so that both the ends thereof penetrate the covers 302, 304, and 306 and the lower bottom 309. With such a structure, the rotating magnet assembly 320 can be rotated around a vertical axis, and ambient air can be introduced to the lower space 314b. The number of pairs of poles of the rotating magnet assembly 320 is not limited to one, but any arbitrarily decided number, e.g., two or three, can be employed. In addition, the rotating magnet assembly 320 is not necessarily formed of integrally formed permanent magnets, but can be formed by arranging a plurality of bar magnets composed of permanent magnets in a circular shape, in such a manner that different poles are alternately put on the outer periphery side.

Instead of the permanent magnets, electromagnets can be used to form the aforementioned rotating magnet assembly.

A driving motor 315 for rotating and driving the rotating magnet assembly 320 is mounted and fixed on the outermost top cover 302 via a mounting base 315A. A driving side sprocket 316 is fixed to a driving shaft 315a of the motor 315, and a driven side sprocket 317 is fixed to the rotation axis 322. A power conveying chain 318 is wound around the pair of sprockets 316 and 317. With such a structure, the shifting magnetic field generating apparatus 403 (the rotation axis 322 and the rotating magnet assembly 320) are rotated by the driving force of the driving motor 315.

Furthermore, a blower 319 is fixed outside (or on the upper surface of the cover 302). The blower 319 is fixed so as to communicate with the rotation axis 322 via a pipe 324, a flexible connection tube 325, and a coupling (now shown). The coupling connects the rotation axis 322, which is rotatable and placed in the lower side thereof in the drawing, and the flexible connection tube 325, which is not rotatable and placed in the upper side thereof in the drawing, so as to be in a communicating state. As a result, air from the blower 319 passes through the rotation axis 322 to flow into the lower space 314b, and passes through the air holes 309a, 309a, . . . to reach the upper space 314a. During this process, the air cools down the heat-resistive container 402 from inside, and then flows out of the air holes 302a, 304a, and 306a to the ambient air. The aforementioned stainless steel cylinder 305 can be formed of a heat-resistant resin. In such a case, the self-heating due to Joule heat does not occur, but the cooling of the radiation heat from the melt etc. can be effectively performed by the use of the blower 319.

When the agitator 401 having the aforementioned structure is put into a commonly used melting furnace, and the rotating magnet assembly 320 is rotated, the melt is agitated by electromagnetic force generated by the rotations of the magnetic lines of force ML outputted from the rotating magnet assembly 320. Since the cooling air from the blower 319 is blown into the heat-resistive container 402 at this time, the stainless steel cylinder 305 is effectively cooled down by the blown air. Thus, in the agitator 401, air from the blower 319 is forcibly sent into the heat-resistive container 402, as shown in FIG. 4. As a result, the Joule heat generated at the outer casing 1 due to the eddy current as the magnet bodies 11, 11, . . . are rotated and the radiation heat from the metal are cooled down by the blow from the blower 19.

FIG. 6 shows, by a plan view, the entire structure of a melting furnace system 500 according to the present invention, which incorporates the aforementioned agitator 401. Schematically, the agitator 401 is provided immediately outside the furnace wall of a melting furnace 501, and the rotating magnet assembly 320 of the agitator 401 is rotated, thereby rotating the magnetic lines of force (magnetic field) emitted therefrom, and forcibly agitating the melt in a melt passage member 507 by electromagnetic force in the direction shown by arrows A, i.e., causing a melt 502 in the melting furnace 501 to flow in the direction shown by arrows B.

More specifically, the melting furnace 501 can be a commonly used one. That is to say, the melting furnace 501 is designed such that scrap such as aluminum or the like is put thereinto, and heated and melted by various kinds of burners (not shown). A melt outlet 504 and a melt inlet 505 are opened in one of the four sidewalls of the melting furnace 501. The melt outlet 504 and the melt inlet 505 are connected to communicate with each other by a melt passage member 507 of a fire-resistant material (or a heat-resistant material), which is substantially U-shaped. With such a structure, the melt 502 in the melting furnace 501 is discharged from the melt outlet 504, circulated through the melt passage member 507, and returned to the melting furnace 501 through the melt inlet 505. That is to say, the melt passage member 507 serves as a bypass.

The aforementioned agitator 401 is located between the U-shaped melt passage member 507 and the melting furnace 501 substantially along the inside surface of the passage member 507. The melt in the melting furnace 501 continuously flows out of the melt outlet 504, circulates, and returns through the inlet 505 as shown by arrows A by the electromagnetic force generated as the rotating magnet assembly 320 of the agitator 401 rotates. As a result, the melt 502 in the melting furnace 501 is agitated as shown by arrows B.

FIG. 7 shows an example in which an agitator 401 is also provided outside the passage member 507. The structure of the other portions is the same as the structure shown in FIG. 6. Accordingly, the same reference numbers are assigned to the commonly used members, and the descriptions thereof are omitted. The number and the locations of the agitators 401 can be arbitrarily set.

In the embodiments of the present invention, permanent magnets are used to generate a magnetic field. Accordingly, the power is only consumed at the blower 319 of a small type and the driving motor 315. When an agitator according to the embodiments of the present invention was installed to a melting furnace in a size of equal to or more than 15 tons, which is a so-called "small furnace", the agitating speed of 20-30 m/min. was obtained. Of course, the agitator can be operated so that the agitating speed is controlled to be at a desired value.

When a conventional agitator of an electromagnetic type is used, the power consumption and the maintenance cost inevitably become large since a plurality of three-phase alternating current coils are provided to serve as a magnetic field generating portion. However, according to the present invention, it is not necessary to use a three-phase alternating current coil in any of the embodiments. Accordingly, the power consumption and the maintenance cost can be decreased. Furthermore, it is possible to easily install an agitator according to the present invention to a conventional furnace.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

In the embodiments discussed above, as a melt, a conductive melt of a metal, a nonferrous metal and other materials may be used, the conductive melt be a melted conductive material of Fe, Al, Cu, Zn, Pb, Ti, Mg, or an alloy or composite of at least two of these materials.

The invention claimed is:

1. A melting furnace with agitator comprising:
a metal furnace for containing a melt, the metal furnace having a metal melting furnace main body and a lateral bypass passage;
a side wall of the metal melting furnace main body having a metal melting furnace main body outlet and a metal melting furnace main body inlet;
wherein the metal melting furnace main body outlet and the metal melting furnace main body inlet are separated by a predetermined distance, wherein the bypass passage has a substantially U shaped horizontal view, and has a bypass inlet at one end, and a bypass outlet at the other end of the bypass passage,
wherein the metal melting furnace main body outlet is in communication with the bypass inlet, and the bypass outlet is in communication with the—metal melting furnace main body inlet;
an agitator arranging space formed between an outer side surface of the side wall of the metal melting furnace main body and an inner side surface of the bypass passage,
wherein the metal melting furnace main body and the bypass passage are adapted such that a flow dividing and a flow converging may be performed,
wherein, in the flow dividing, melt flowing in the metal inciting furnace main body is divided into a first melt and into a second melt, the first melt rotationally flows in the metal melting furnace main body, and the second melt flows into the bypass passage via the metal melting furnace main body outlet and the bypass inlet; and
wherein, in the flow converging, the second melt flows into the metal melting furnace main body via the bypass outlet and the metal melting furnace main body inlet;
an agitator located in the agitator arranging space, the agitator being opposite to an inner side surface of the bypass passage, and having a casing and a rotating magnet assembly within the casing such that the rotating magnet assembly is rotatable supported by a vertical shaft,
the rotating magnet assembly having one or more permanent magnets, wherein magnetic flux from the one or more permanent magnets penetrates the melt in the bypass passage and returns to the one or more permanent magnets, moving the melt in accordance with a rotation of the one or more permanent magnets such that the magnetic flux drives the melt in the bypass passage to flow in the bypass passage, the flow of the melt in the bypass passage flowing into the melt in the metal melting furnace main body to result in flow converging, and causing melt in the metal main body to flow into the bypass passage to flow into the bypass passage, to result in flow dividing, wherein the flow converging and the flow dividing is continuously performed according to the continuous rotation of the magnet assembly.

2. The melting furnace of claim 1, further comprising a second agitator disposed in a space adjacent to an outer side wall of the bypass passage, the agitator and the second agitator are opposite to each other via the bypass passage, wherein the agitator and the second agitator cause the flow of melt in the bypass passage.

3. The melting furnace of claim 1, wherein the rotating magnet assembly includes a plurality of permanent magnets arranged at regular intervals along a circle surrounding the vertical shaft.

4. The melting furnace of claim 2, wherein the rotating magnet assembly includes a plurality of permanent magnets arranged at regular intervals along a circle surrounding the vertical shaft.

5. The melting furnace of claim 3, wherein each of the plurality of permanent magnets has magnetic poles at an outer periphery side and an inner periphery side, and the poles of two adjacent permanent magnets are different from each other at both the outer periphery side and the inner periphery side.

6. The melting furnace of claim 4, wherein each of the plurality of permanent magnets has magnetic poles at an outer periphery side and an inner periphery side, and the poles of two adjacent permanent magnets are different from each other at both the outer periphery side and the inner periphery side.

7. The melting furnace of claim 1, wherein at least one of the one or more permanent magnets has a columnar shape, and is magnetized so that different magnetic poles are alternately arranged around the outer periphery of the vertical shaft.

8. The melting furnace of claim 2, wherein at least one of the one or more permanent magnets has a columnar shape, and is magnetized so that different magnetic poles are alternately arranged around the outer periphery of the vertical shaft.

* * * * *